United States Patent
Kudoh (10) Patent No.: US 6,302,935 B1
(45) Date of Patent: Oct. 16, 2001

(54) APPARATUS FOR REMOVING FINE PARTICLES IN EXHAUST GAS AND APPARATUS FOR CLEANING EXHAUST GAS

(75) Inventor: Yasushi Kudoh, Machida (JP)

(73) Assignee: Lead Industry Company, Ltd., Tokyo (JP)

(*) Notice: Subject to any disclaimer, the term of this patent is extended or adjusted under 35 U.S.C. 154(b) by 0 days.

(21) Appl. No.: 09/455,231

(22) Filed: Dec. 6, 1999

Related U.S. Application Data (63) Continuation of application No. PCT/JP99/00435, filed on Feb. 1, 1999.

(51) Int. Cl.$^7$ ................................................. B01D 53/22
(52) U.S. Cl. ........................ 55/523; 55/385.3; 95/273; 210/650; 210/510.1
(58) Field of Search ...................... 55/385.3, 522, 55/523, DIG. 28, DIG. 30, 524; 123/198 E; 95/273; 210/650, 510.1

(56) References Cited

U.S. PATENT DOCUMENTS

| | | |
|---|---|---|
| 5,281,399 | 1/1994 | Rittler . |
| 5,716,559 * | 2/1998 | Larsen et al. ........................... 55/523 |
| 5,961,929 * | 10/1999 | Lawless .................................. 55/523 |
| 5,997,744 * | 12/1999 | Limaye .................................. 55/523 |
| 6,077,436 * | 6/2000 | Rajnik et al. ........................... 55/523 |

FOREIGN PATENT DOCUMENTS

| | | |
|---|---|---|
| 56-94810 | 12/1979 | (JP) . |
| 59-134314 | 8/1984 | (JP) . |
| 62-99610 | 5/1987 | (JP) . |
| 63-9613 | 1/1988 | (JP) . |
| 64-77715 | 3/1989 | (JP) . |
| 1-159408 | 6/1989 | (JP) . |
| 5-171918 | 7/1993 | (JP) . |

* cited by examiner

Primary Examiner—David A. Simmons
Assistant Examiner—Minh-Chau T. Pham
(74) Attorney, Agent, or Firm—Knoble & Yoshida, LLC (57) ABSTRACT

The present invention discloses a fine particle-removing device connected to an exhaust path for a combustion exhaust gas, for removing fine particles contained in the exhaust gas. The apparatus has filter units, a fuel injection nozzle and an ignition device. The filter units are made of porous ceramic partitions that form a plurality of narrow paths extending in the flowing direction of the exhaust gas. The porous ceramic partitions capture the fine particles contained in the exhaust gas when the exhaust gas is introduced into one side and exhausted from the other side of each path. The fuel injection nozzle injects a fuel into exhaust gas intake portions of the filter units to burn the fine particles captured on the porous ceramic partitions.

11 Claims, 10 Drawing Sheets

APPARATUS FOR REMOVING FINE PARTICLES IN EXHAUST GAS AND APPARATUS FOR CLEANING EXHAUST GAS

This application is a continuation of PCT/JP99/00435 filed on Feb. 1, 1999.

TECHNICAL FIELD

The present invention relates to an apparatus for removing fine particles in an exhaust gas, which removes black smoke particles contained in exhaust gases emitted from diesel engines and various boilers, and an apparatus for cleaning an exhaust gas.

BACKGROUND ART

An exhaust gas from a diesel engine contains nitrogen oxides and black smoke particles (particulate) that are harmful to human bodies. Among them, the black smoke particles consist mainly of carbons. To remove the particles, various fine particle-removing devices have already been proposed. For example, JPA 01-77715 discloses such a device that employs a ceramic filter of cross-flow type. In this device, an intake path and an exhaust path for an exhaust gas are arranged in such a relation that they cross with each other at right angle via a partition of gas-permeable porous solid (ceramic). The black smoke particles are captured at the partition when the introduced exhaust gas penetrates through the partition.

JPA 01-159408, for example, also discloses a fine particle-removing device that utilizes a ceramic filter with a honeycomb structure. In this device, a gas-permeable porous solid is also used as partitions that form respective cells in the honeycomb structure. In addition, one end with respect to a first group of cells and the other end with respect to a second group of cells are closed. Then, an exhaust gas is introduced into the second group of cells from the first group of cells via respective partitions so as to capture the black smoke particles at each partition.

Either of the above-mentioned conventional devices for removing fine particles in exhaust gases is, however, a system for filtering the black smoke particles by allowing them to penetrate through the partition of a porous material. Accordingly, there is a disadvantage that a resistance against the exhaust gas flow is increased and the output of the diesel engine is lowered. In addition, the black smoke particles captured at the partition are finally burned up to dispose. At this moment, another disadvantage is caused because ashes remained after burning up may stay over the surface of the partition and clog the filter gradually, lowering the filter function finally, increasing the exhaust resistance further more and lowering the output of the engine. For this reason, adapted in the art is a method of rinsing back the black smoke particles captured at the surface of the ceramic partition and burning them up after transferring them to another location. Therefore, the device disadvantageously becomes a larger scale.

DISCLOSURE OF INVENTION

The present invention has been made in consideration of such the situations and has an object to provide an apparatus for removing fine particles in an exhaust gas. The apparatus is capable of suppressing an increase of an exhaust resistance so as to prevent the output from lowering, and of simplifying the apparatus by processing captured fine particles efficiently. The present invention also provides an apparatus for cleaning an exhaust gas that utilizes the apparatus for removing fine particles.

The present invention is provided with a fine particle-removing apparatus connected to an exhaust path for an exhaust gas emitted from a combustion engine, for removing fine particles contained in the exhaust gas. The apparatus comprises a filter for capturing the fine particles contained in the exhaust gas at partitions during the exhaust gas being introduced into one side and exhausted from the other side of a plurality of paths. The plurality of paths are defined by the partitions and formed to extend in the direction of a flow of the exhaust gas. The apparatus also comprises a fuel injection nozzle for injecting a fuel into an exhaust gas intake portion of the filter, and an ignition means for igniting the fuel injected from the fuel injection nozzle.

In the present invention, once the exhaust gas is introduced into each of the plurality of narrow paths that extend in the direction of the gas flow, the exhaust gas travels within the paths while the gas is disturbed to flow by the partitions that define the paths. In this process, the fine particles contained in the exhaust gas are captured at the surfaces of the partitions, which are in parallel to the direction in which the paths extend. The fuel is injected into the exhaust gas intake portion of the filter from the fuel injection nozzle. When the ignition means ignites the fuel, flames are carried by the exhaust gas flow and extend over each wall of the paths, burning up the fine particles captured at the walls of the paths. Ashes remained after burning are ejected to the outside of the filter in accordance with the exhaust gas flow.

As described above, according to the present invention, the filter forms a plurality of paths extending in the direction of the exhaust gas flow. Then, the exhaust gas is introduced into one side and emitted from the other side of the paths. In this process, the fine particles are captured at the walls of the paths. Therefore, the exhaust gas can flow extremely smoother and the exhaust resistance can be suppressed sufficiently lower than the conventional systems that filter the gas with porous materials, thereby preventing the output from lowering. The exhaust gas is disturbed slightly to flow during it travels through the narrow paths. As the result, the fine particles in the exhaust gas can be captured well at the partition walls of the paths. In addition, the ashes, which remains after burning the fine particles captured at the partition walls, are smoothly ejected to the outside of the filter and do not stay over the filter surfaces. Thus, maintenance is hardly required and the apparatus can be simplified. Further, if the same light oil as a fuel for the diesel engine is used as the fuel for burning the fine particles, for example, a particular fuel supply is not required and maintenance becomes much easier.

If the filter is made of gas-permeable porous solid, the exhaust gas, which travels along with turbulent flows in the narrow paths, flows so as to penetrate even into the inside of the partitions. Thus, the fine particles contained in the exhaust gas can be captured further effectively at the partition walls.

The filter may be definitely formed to have plural paths extending in the direction of the exhaust gas flow and arranged in the direction perpendicular to the exhaust gas flow. The plural paths are defined by plural partitions, which consist of porous ceramic plates and arranged in parallel, and have substantially rectangular cross sections. More preferably, the filter may include plural stages of filter units. In this case, porous ceramic partitions in adjacent filter units may be arranged to cross at right angle to each other. This arrangement enables to increase the effect of providing the exhaust gas with turbulent flows so as to capture the fine particles further effectively.

Further comprising a means for introducing a combustion promoting gas such as an air into the exhaust gas intake portion of the filter, as well as applying a combustion promoting agent on at least parts of the partition surfaces of the filter, may improve a combustion efficiency during the fine particles are burned.

Burning the fine particles may be performed intermittently when a predetermined amount of the particles is accumulated over the partition surfaces of the filter. In this case, the apparatus may perform a burning operation when a temperature of the filter drops to a predetermined value by further comprising a temperature sensor for detecting a temperature of the filter and a control means, for example. The control means allows the fuel injection nozzle to inject the fuel and the ignition means to perform an igniting operation if the temperature sensor detects a temperature lowered down to a first temperature. The control means also halts the fuel injection nozzle to inject the fuel if the temperature sensor detects a temperature elevated up to a second temperature higher than the first temperature.

In case where the above-mentioned filter is disposed in an exhaust path of a diesel engine, combining the filter with an exhaust gas return control device for returning the exhaust gas from the exhaust path to an intake path of the diesel engine can configure an exhaust gas cleaning apparatus. Thus configured apparatus can prevent the black smoke from returning into the intake portion of the engine and reduce NOx at the same time. Arranging a catalyzing device at the exhaust portion of the filter may further clean the exhaust gas effectively.

BEST MODE FOR CARRYING OUT THE INVENTION

Preferred embodiments of the present invention will be described below with reference to the drawings.

Figure 1:
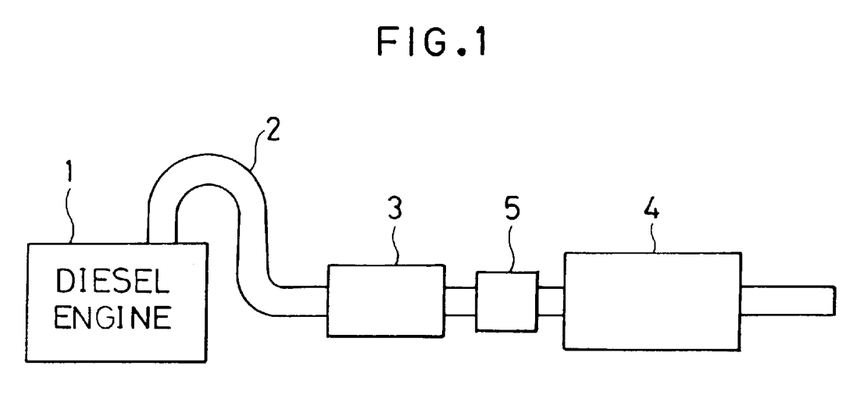
FIG. 1 is a diagram illustrating an exhaust system of a diesel engine to which a fine particle-removing apparatus according to an embodiment of the present invention is adaptive.

FIG. 1 is a diagram illustrating an exhaust system of a diesel engine to which an apparatus for removing fine particles in an exhaust gas of the present invention is adapted.

An exhaust gas from a diesel engine 1 passes through a sub muffler 3 and main muffler 4 in the process of passing through an exhaust pipe 2. In this embodiment, a fine particle-removing device 5 is interposed between the sub muffler 3 and the main muffler 4, and removes black smoke particles contained in the exhaust gas.

Figure 2:
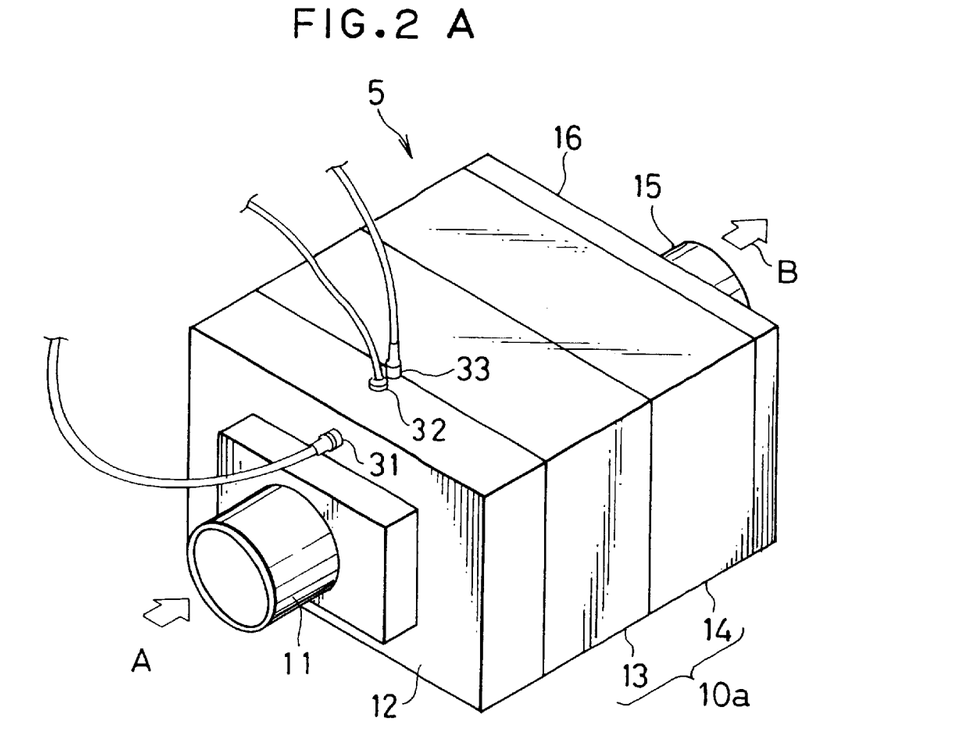
FIGS. 2A and 2B are squint views showing the exterior and interior of the apparatus.
Figure 3:
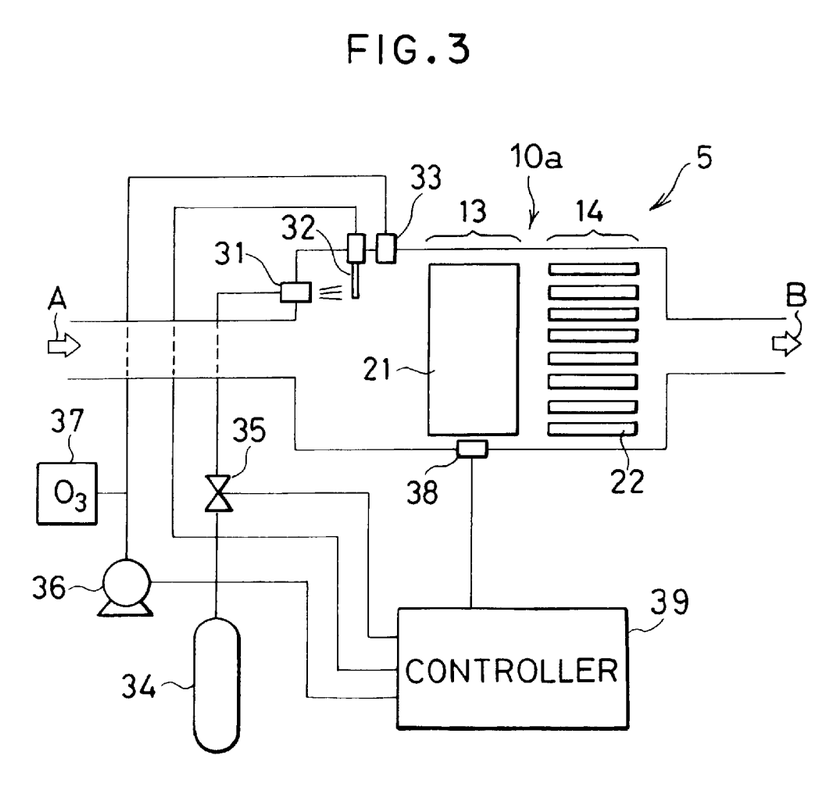
FIG. 3 is a control system diagram of the apparatus.

FIGS. 2 and 3 are diagrams showing the fine particle-removing device 5 in detail, in which FIG. 2A is an exterior squint view, FIG. 2B is a squint view illustrating an interior state, and FIG. 3 is a system diagram.

As shown in FIG. 2A, the fine particle-removing device 5 consists mainly of a front cover 12 with an inlet 11 to which an unfinished exhaust gas A that has not been finished to remove fine particles is introduced; a filter 10a for removing the fine particles from the exhaust gas; and a rear cover 16 with an outlet 15 for disposing a finished exhaust gas B. The filter 10a consists of a first filter unit 13 and a second filter unit 14 arranged in the direction of the exhaust gas flow.

The first filter unit 13 and the second filter unit 14 consist of a plurality of first partitions 21 and a plurality of second partitions 22 that are arranged with a predetermined interval in the direction of the exhaust gas flow (A, B) as shown in FIG. 2A. The first and second partitions 21 and 22 are of porous ceramic plates, and more definitely gas-permeable porous plates of cordierite series. The first and second partitions 21 and 22 are arranged more than one in the direction perpendicular to the direction of the exhaust gas flow interposing respective predetermined intervals (e.g. intervals of 5–30 mm): the first partitions 21 in the lateral direction, and the second partitions 22 in the longitudinal direction. In the first filter unit 13, narrow paths 23, which are defined by the partitions 21 and extend in the direction of the exhaust gas flow, are arranged more than one in the lateral direction perpendicular to the direction of the exhaust gas flow. Similarly, in the second filter unit 14, narrow paths 24, which are defined by the partitions 22 and extend in the direction of the exhaust gas flow, are arranged more than one in the longitudinal direction perpendicular to the direction of the exhaust gas flow. The paths 23 and 24, which have substantially rectangular cross sections intersecting to each other at right angle, both extend in parallel to the direction of the exhaust gas flow. The black smoke particles are captured at both surfaces of the partitions 21 and 22 that define these paths 23 and 24.

Mounted on the front cover 12 are a fuel injection nozzle 31, an ignition device 32 and a combustion promoting gas introduction nozzle 33. A control system for these will be described with reference to FIG. 3. A butane gas can be employed, for example, as the fuel for burning the black smoke particles captured at the surfaces of the ceramic partitions 21 and 22. In this case, the butane gas stored in a bin 34 is injected into exhaust gas intake portions of the filter units 13 and 14 from the fuel injection nozzle 31 through a valve 35. The ignition device 32 is arranged at the injection position and the burning promotion gas introduction nozzle 33 is located at a further rear stage. The combustion promoting gas is typically an air supplied from a compressor 36, and ozone is preferably added slightly from an ozone generator 37 to increase a combustion efficiency. Such the gas is supplied from the nozzle 33 to the exhaust gas intake portions of the filter units 13 and 14.

In proximity to the ceramic partition 21, a temperature sensor 38 is disposed to detect a temperature of the partition 21. The temperature detection result is introduced into a controller 39. The controller 39 controls the valve 35, ignition device 32 and compressor 36 based on the temperature detection result, respectively.

An operation of thus configured fine particle-removing device will be described next.

The temperature of the exhaust gas emitted from the diesel engine 1 lowers in the process of passing through the sub muffler 3 and main muffler 4 and exhibits approximately 400° C.–600° C. at the rear stage of the sub muffler 3. Once the exhaust gas is introduced into the inside of the fine particle-removing device 5 through the inlet 11 of the device 5, it passes through first each path 23 of the first filter unit 13 and then each path 24 of the second filter unit 14. The exhaust gas is disturbed to flow in the process of passing through the narrow paths 23 and 24, and the black smoke particles contained in the exhaust gas attach to the surfaces of the partitions 21 and 22, since the filter units 13 and 14 are composed of the porous ceramic partitions 21 and 22. Fluid resistances at the narrow paths 23 and 24 are extremely low, however, since they extend in the direction of the exhaust gas flow. Therefore, the exhaust gas, which remains after the black smoke particles are removed, can be smoothly ejected from the outlet 15.

Figure 4:
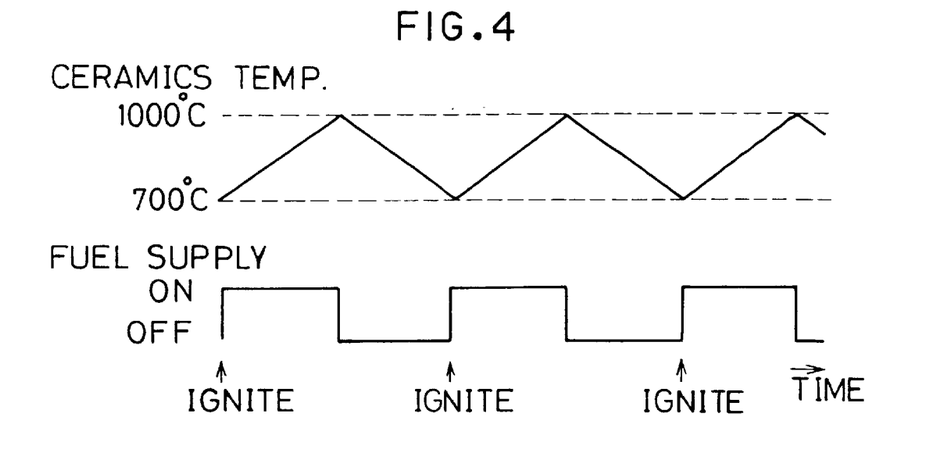
FIG. 4 is a timing chart for explaining operations of the apparatus.

FIG. 4 is a timing chart for explaining the combustion control of the device 5. When the temperature detected at the temperature sensor 38 is equal to or below a first temperature (e.g. 700° C.), the controller 39 opens the valve 35, operates the compressor 36, and turns the ignition device 32 on. As a result, the fuel or the butane gas is ignited, and the black smoke particles attached over the surfaces of the ceramic partitions 21 and 22 are burned, while the combustion is promoted by supplying the combustion promoting gas. The ashes remained after combustion are ejected along with the exhaust gas through the outlet 15. Thus, the ceramic partitions 21 and 22 are prevented from clogging.

When the temperature of the ceramic partition 21 elevated up to a second temperature (e.g. 1000° C.) after the continuous combustion, the controller 39 closes the valve 35 and put off the compressor 36 to halt the combustion operation. As a result, the temperature inside the device 5 is prevented from elevating excessively. When the temperature lowers down to the first temperature again, the same operation will be repeated.

Figure 5:
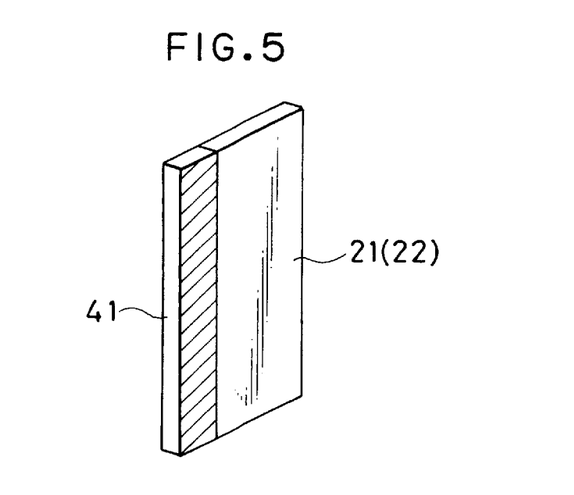
FIG. 5 is a diagram illustrating an example of a ceramic partition in the apparatus.
Figure 6:
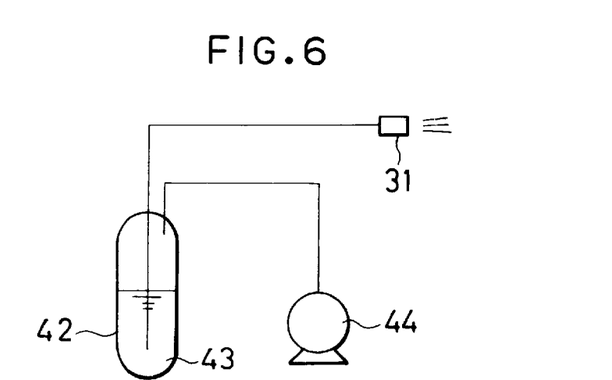
FIG. 6 is a diagram showing a fuel injection system according to another embodiment of the present invention.

A combustion-promoting agent 41 such as platinum may be effectively applied on at least parts of the ceramic partitions 21 and 22 as shown in FIG. 5, for example. Thereby further promoting the combustion at the surfaces of the partitions 21 and 22 and enabling to process the black smoke particles more efficiently. A liquid fuel such as ethanol may be employed as the fuel instead of gaseous fuel such as the butane gas. In this case, a liquid fuel 43 stored in a tank 42 may be supplied to the fuel injection nozzle 31 by lifting it up with a pump 44 as shown in FIG. 6.

Figure 7:
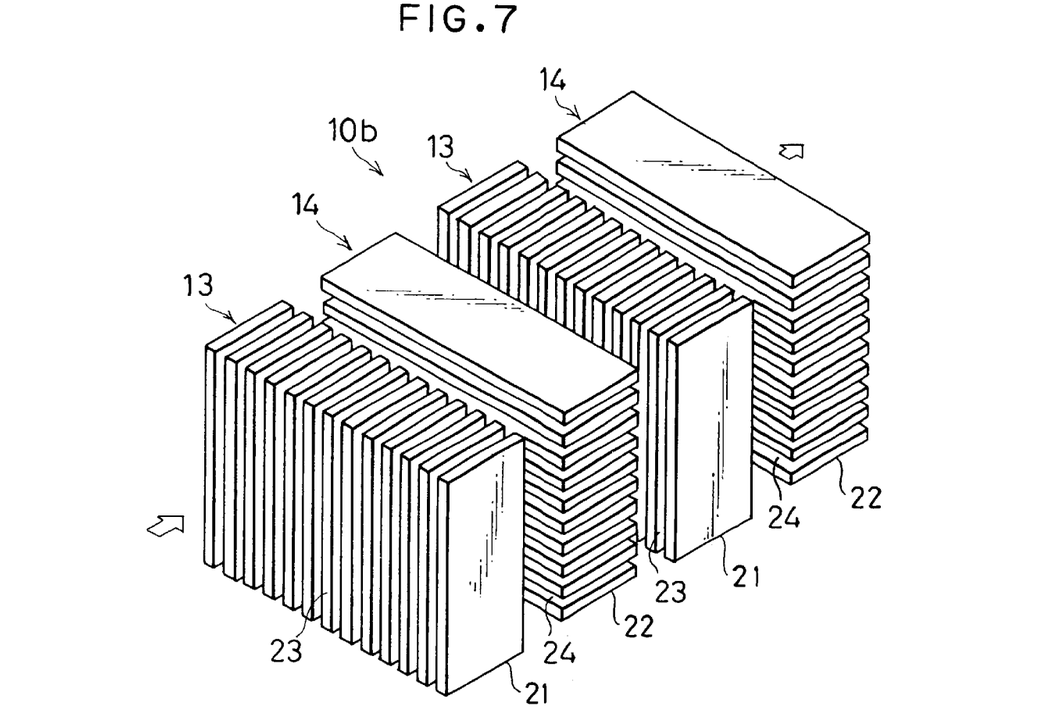
FIG. 7 is a squint view illustrating a filter according to another embodiment of the present invention.

FIG. 7 shows a configuration of a filter 10b according to another embodiment. In this embodiment, first filter units 13 and second filter units 14 are alternately arranged four stages in total in the direction of the exhaust gas flow interposing a predetermined gap therebetween. Porous ceramic partitions 21 of the first filter units 13 and porous ceramic partitions 22 of the second filter units 14 are arranged one or more in the directions crossing with each other at right angle. Accordingly, the plural paths 23 and 24, which cross with each other at right angle and have substantially rectangular cross sections, are linked in the multiplexed form along the exhaust gas flow.

Thus, the passing exhaust gas becomes a turbulent flow, resulting in an increased amount of fine particles absorbed on the partitions by combining the filter units in such the multi-stage that the partitions which define the paths in adjacent units to cross with each other at right angle. That is, the efficiency for removing fine particles becomes much higher. In addition, the increase of the exhaust resistance can be ignored since the paths 23 and 24 in respective filter units are in parallel to the direction of the exhaust gas flow.

Figure 8:
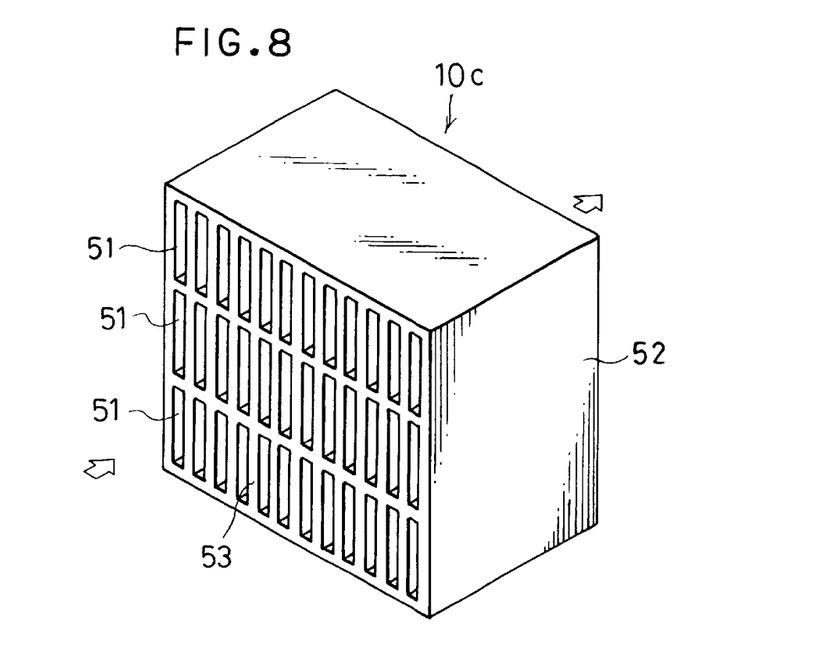
FIG. 8 is a squint view illustrating a filter according to a further embodiment of the present invention.

FIG. 8 shows a configuration of a filter 10c according to a further embodiment. In this embodiment, the filter 10c consists of a single porous ceramic block 52. The block 52 includes many paths 51 that are defined by ceramic partitions 53 to extend in the direction of the exhaust gas flow and are processed to arrange one or more both in the longitudinal and lateral directions, respectively. In this case, the paths 51 may be effectively shaped to be longitudinally long rectangular at gas intake portions and laterally long rectangular at gas exhaust portions.

The reason why device 5 is located at the front stage of the sub muffler 4 as shown in FIG. 1 is based on that a temperature of the exhaust gas at that location is about 600° C. and is convenient. The device of the present invention, however, can also be located, for example, inside the sub muffler 3 or at the rear stage of main muffler 4, needless to say.

Figure 9:
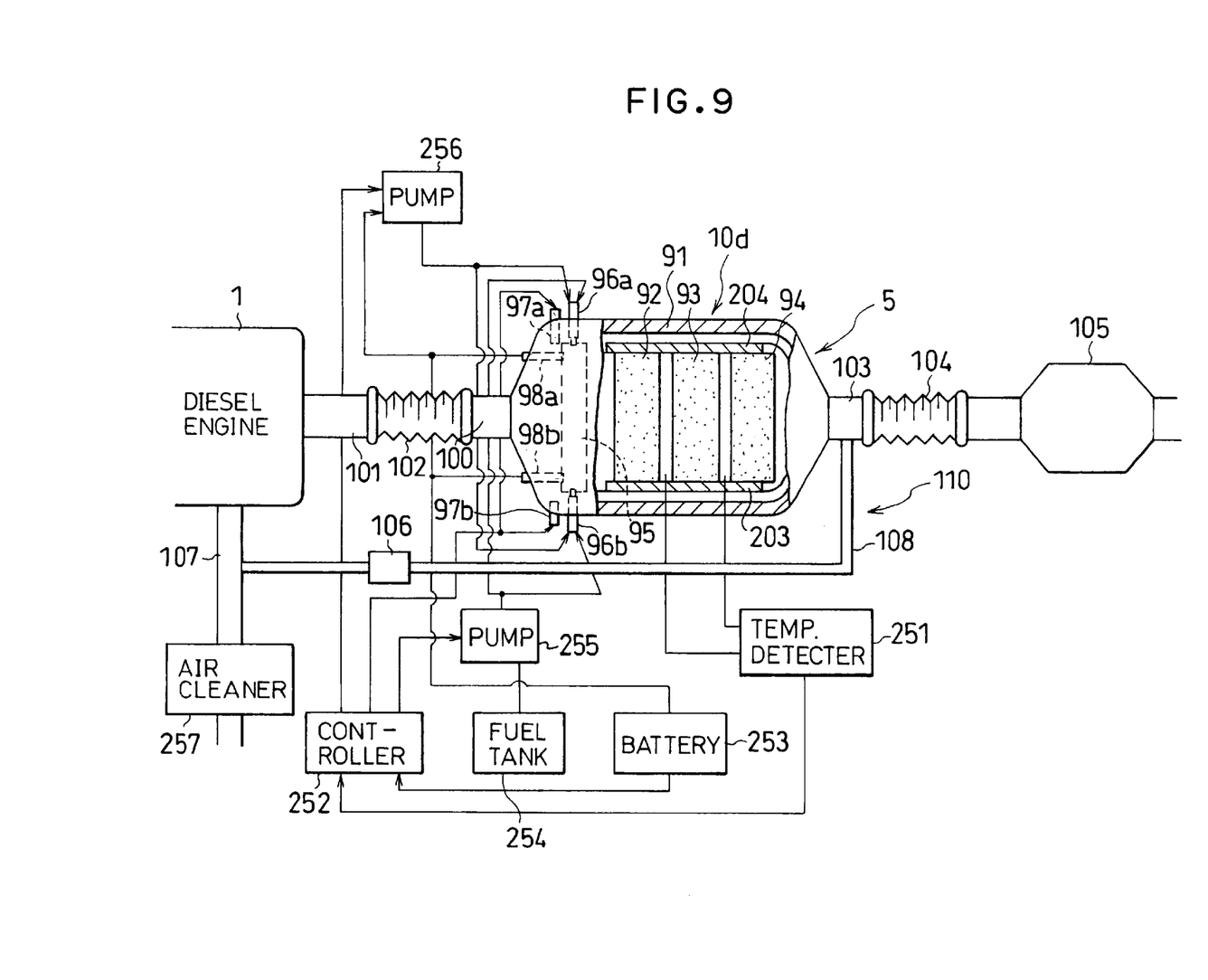
FIG. 9 is a diagram illustrating an exhaust gas cleaning apparatus according to a further embodiment of the present invention.

FIG. 9 shows a configuration of an exhaust gas cleaning apparatus according to a further preferred embodiment of the present invention, in which the fine particle-removing device 5 of the present invention is fabricated. The apparatus is of the diesel engine 1 that includes an EGR device (Exhaust Gas Return device) and a catalyzing device. A filter 10d, which is contained in the body of the fine particle-removing device 5, includes a gas intake pipe 100 connected to an exhaust pipe 101 of the diesel engine 1 through a bellows gas pipe 102. The filter 10d also includes an exhaust pipe 104 connected, through a bellows gas pipe 104, to a catalyzing device 105 for removing harmful gases. The catalyzing device 105 is definitely configured with catalysts capable of removing CO, HC and NOx.

Figure 10:
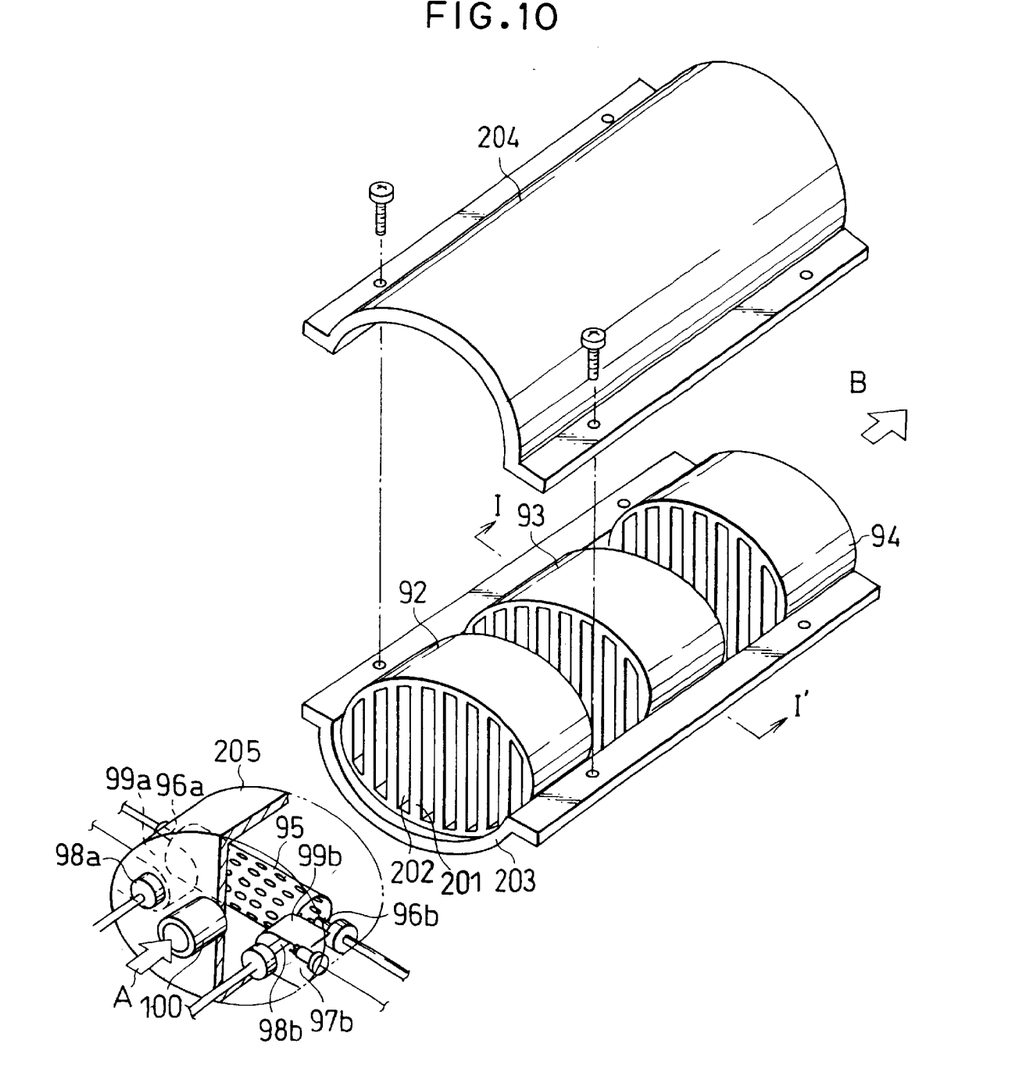
FIG. 10 is a squint view illustrating a configuration of a filter according to the embodiment.
Figure 11:
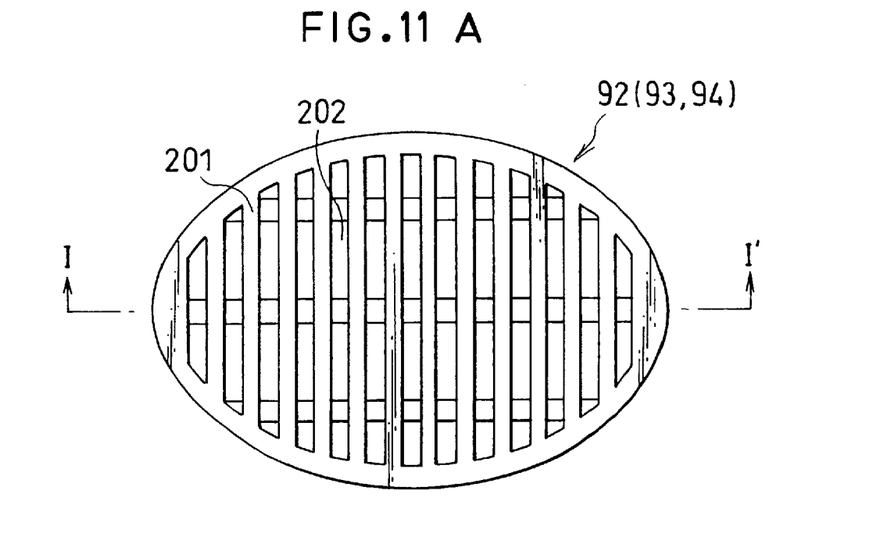
FIGS. 11A and 11B are a front and cross sectional views of a filter unit for use in the filter of the embodiment.

As shown in FIG. 10, the filter 10d in this embodiment has three stages of filter units 92, 93 and 94 that are arranged within one filter container 91. The three stages of filter units 92, 93 and 94 consist of porous ceramic blocks in the form of oval columns. As shown in FIGS. 10 and 11, each of the filter units 92, 93 and 94 has a plurality of paths 202 that are defined by porous ceramic partitions 201 and extend in the direction of the exhaust gas flow. FIG. 11B shows a cross section of one of the units sectioned with the horizontal plane passing through the center of the unit (cross section at the I–I' line shown in FIGS. 10 and 11A). The partitions 201 are linked with each other at their outer circumferential portions, and are also linked laterally with each other at the central portion and optionally upper and lower portions.

The three stages of filter units 92, 93 and 94 are positioned with not-depicted positioning members, and then sandwiched between upper and lower stainless covers 203 and 204 to fabricate integrally so as to be arranged with a certain interval in the direction of the exhaust gas flow. A cushion material such as ceramic fibers may preferably be wounded around each of the filter units 92, 93 and 94 to avoid any damages from vibrations.

Figure 12:
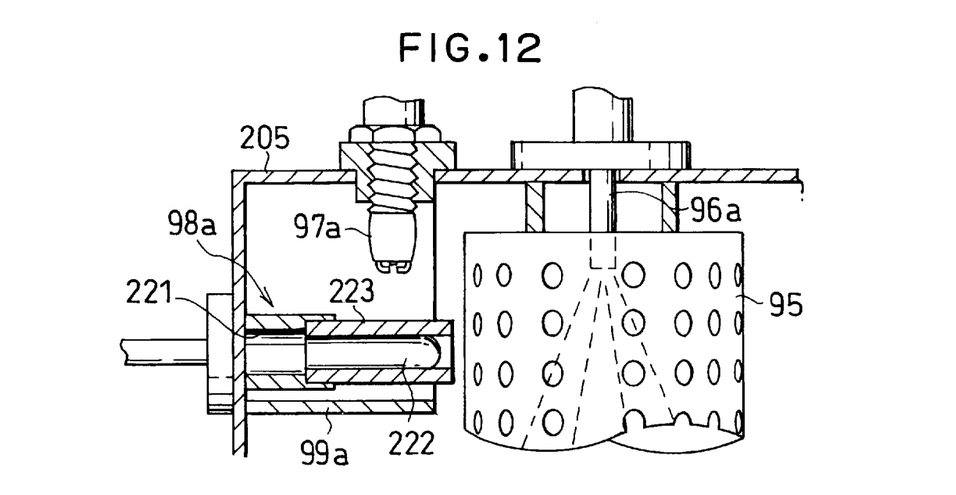
FIG. 12 is a cross sectional view illustrating a part of the filter.

As shown in FIG. 10, a front cover 205 for forming a combustion chamber is disposed at the front stage of the filter units 92, 93 and 94. A porous combustion tube 95 is arranged within the front cover 205 so that its axis intersects with the direction of the exhaust gas flow at right angle. Spray nozzles 95a and 95b are disposed at both ends of the combustion tube 95. Spark plugs 97a, 97b and ignition heaters 98a, 98b are arranged adjacent to the spray nozzles 96a and 96b. The spark plug 97a and ignition heater 98a are surrounded by a protection wall 99a, and the spark plug 97b and ignition heater 98b by a protection wall 99b, respectively. Regions surrounded by the protection walls 99a and 99b are hardly affected from the exhaust gas flow, and mixed gases sprayed from the spray nozzles 96a and 96b may stay in the regions with a high density to realize an environment suitable for ignition. FIG. 12 shows a cross sectional view of the ignition heater 98a and its periphery. The ignition heater 98a comprises a holder 221 for fixing, a glow 222 supported by the holder 221, and a ceramic tube 223 with a rich permeability for surrounding the periphery of the glow 222. When a switch for the glow 222 is turned on and the ceramic tube 223 at its periphery is heated, a fuel permeated into the ceramic tube 223 is vaporized and then ignited exactly with sparks from the spark plug 97a.

As shown in FIG. 9, in order to configure an EGR device 110, a part of the exhaust gas, which flows through an exhaust pipe 103 of the filter 10d, is fed back via a return path 108 to an intake pipe 107 located between an air cleaner 257 and the diesel engine 1. Interposed into a midpoint of the return path 108 is an EGR valve 106 which controls a return amount of the exhaust gas or an inert gas so as to lower a combustion temperature in the diesel engine 1 to reduce NOx.

A temperature detector 251 detects a temperature of the ceramic in the filter 10d and sends the detected value to a controller 252. A fuel such as light oil stored in a fuel tank 254 is supplied to each of spray nozzles 96a and 96b by a pump 255. Another pump 256 supplies an air to each of the spray nozzles 96a and 96b. A battery 253 supplies necessary power to the spark plugs 97a, 97b, ignition heaters 98a, 98b and controller 252.

Figure 13:
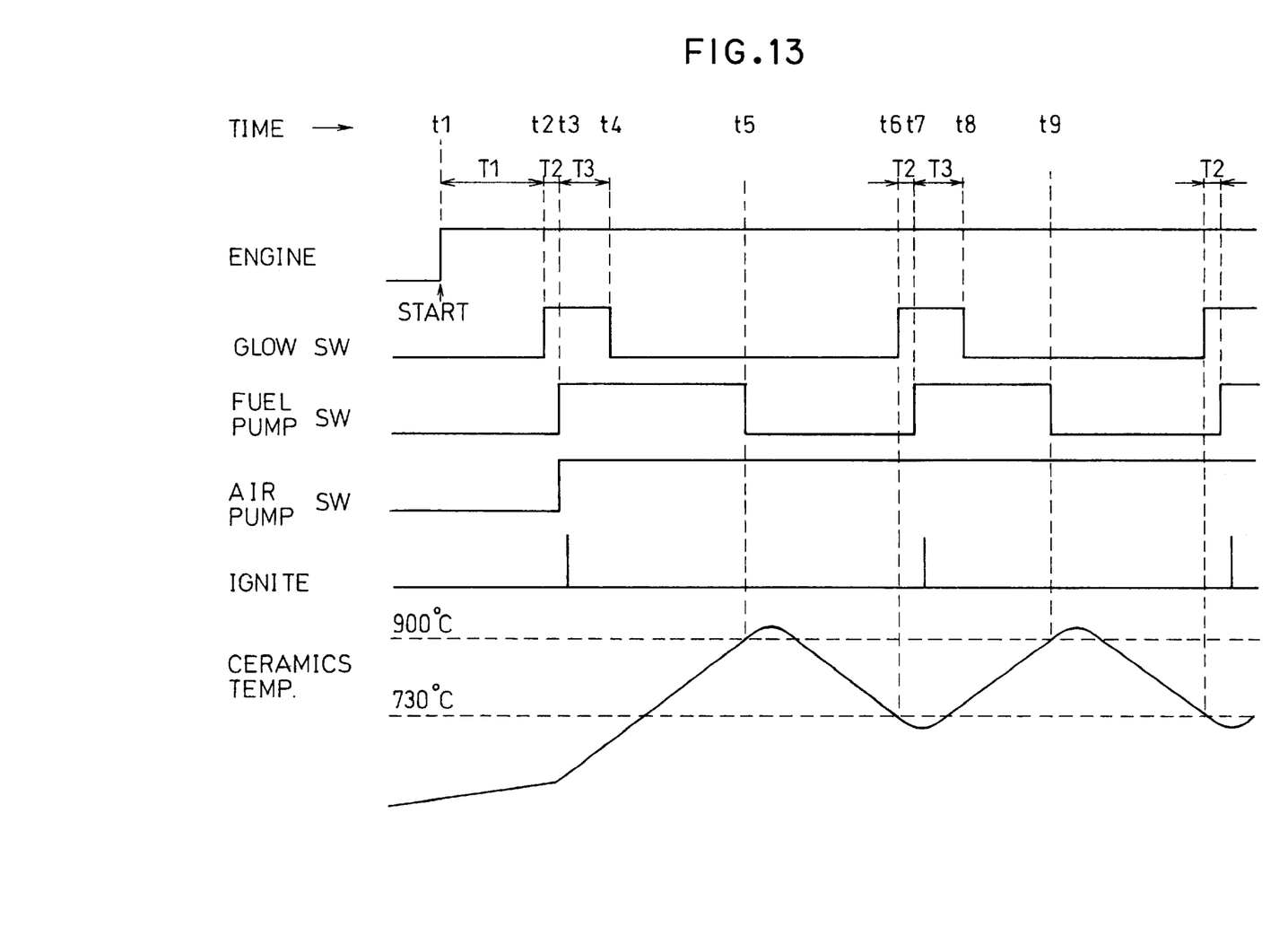
FIG. 13 is a timing chart for explaining a burning control operation of the filter in the exhaust gas cleaning apparatus.

An operation of thus configured exhaust gas reducing device will be described next with reference to a timing chart of FIG. 13.

First, the diesel engine 1 is started at time t1. Then, the switch for the glow 222 is turned on at t2 later than t1 by T1 (e.g. 1 minute). Thereafter, the fuel supplying pump 255 and the air supplying pump 256 are put on at t3 later than t2 by T2 (e.g. 10 seconds) to introduce the mixed gas into the combustion chamber so as to prepare an ignition environment. At this moment, an ignition by red heat of the glow 222 can be performed. To ignite exactly, however, ignitions by the spark plugs 97a and 97b are used to start the combustion operation. The temperature in the filter 10d elevates with the combustion inside the combustion tube 95 and the black smoke attached over the surfaces of the partitions 201 is burned up and removed. Once the combustion operation is started, heating by the glow 222 becomes unnecessary. Therefore, the switch for the glow 222 is turned off, for example, after confirming the combustion operation at t4 later than t3 by T3 (e.g. 30 seconds). The fuel-supplying pump 255 is put off when the temperature detector 251 detects that the ceramic temperature of the filter 10d reaches up to 900° C. at t5. The air-supplying pump 256 for, however, continues to maintain its on-state. Thus, oxygen required for burning is continuously supplied, and the combustion at the surface of the partition 201 is continued. The exhaust gas gradually lowers the surface temperature of the partition 201, however, because halting the fuel supply has stopped the combustion inside the combustion tube 95.

When the temperature detector 251 detects that the ceramic temperature of the filter 10d lowers down to 730° C. at t6, the switch for the glow 222 is turned on again, and the fuel supplying pump 255 is put on at t7 later than t6 by T2. The ignition operation with sparks is made, and the switch for the glow 222 is turned off at t8 later than the time of supplying the fuel by T3. When the temperature detector 251 detects that the ceramic temperature reaches to 900° C. at t9, the fuel supplying pump 255 is put off. Similar operations are repeated hereafter.

Figure 14:
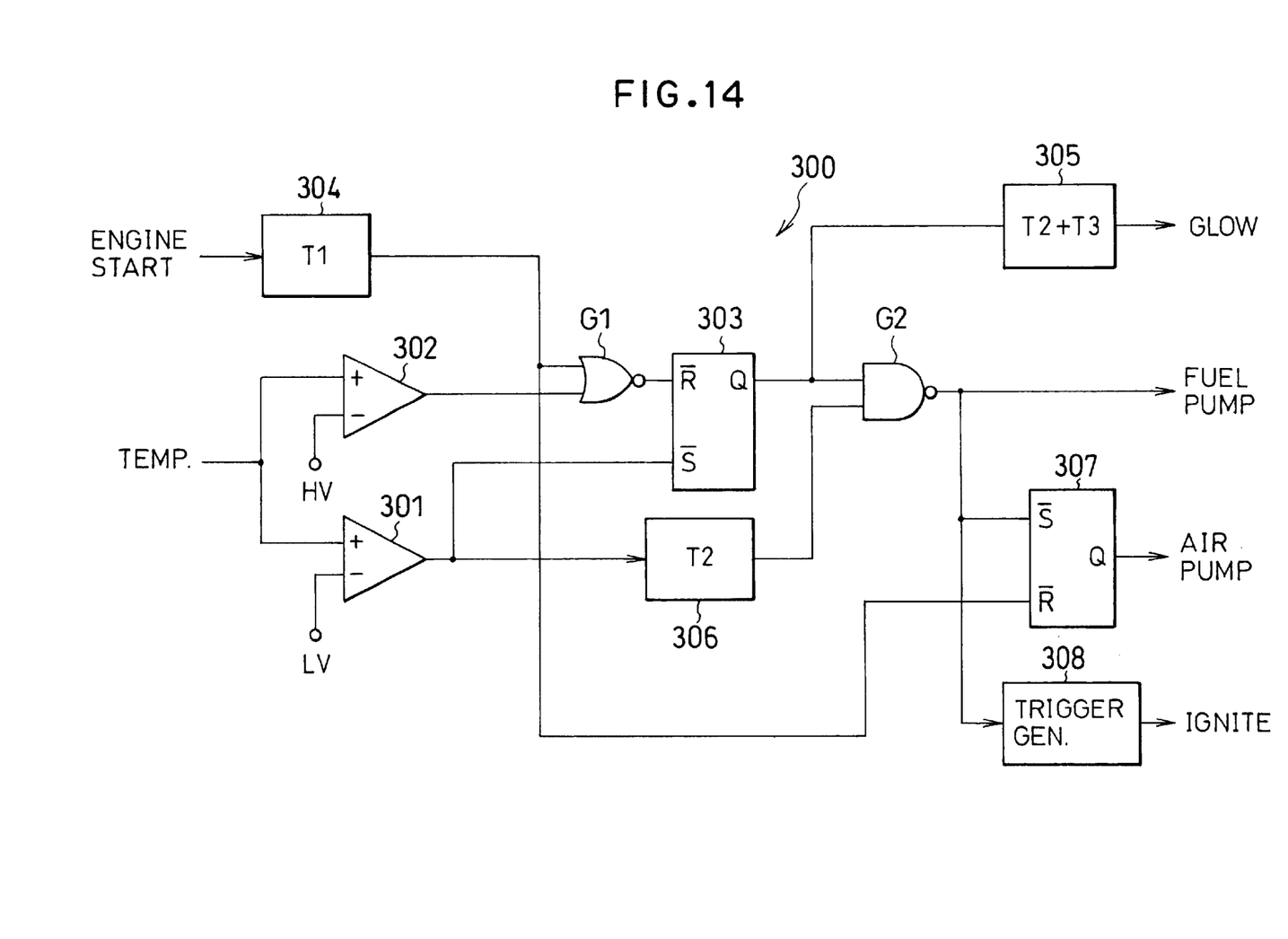
FIG. 14 is a block diagram showing an arrangement of a controller for performing a burning control to the filter.

FIG. 14 shows an arrangement of a combustion control circuit 300 contained in the controller 252 for performing the above combustion control. The output from the temperature detector 251 is fed into two comparators 301 and 302. These comparators 301 and 302 determine a level of the input temperature signal with a low-level voltage LV (e.g. corresponds to the first temperature, 730° C.) and high-level voltage HV (e.g. corresponds to the second temperature, 900° C.) as reference voltages, respectively. When the level of the temperature signal lowers below the low-level voltage LV, the output of the comparator 301 becomes "L" which in turn sets a flip-flop 303 to exhibit the Q-output="H". On the other hand, when the level of the temperature signal elevates above the high-level voltage HV, the output of the comparator 302 becomes "H" which in turn resets the flip-flop 303 to exhibit the Q-output="L". A start-reset signal is fed to the reset input of the flip-flop 303 through a NOR gate G1 in order to inhibit the combustion control operation during a battery voltage is lowed at the time of starting the engine. The start-reset signal exhibits "H" within a time period of T1 set by a timer 304 after an engine start signal is input. The glow 222 is turned on during a time period of T2+T3 set by a timer 305 after the rise of the Q-output of the flip-flop 303. A NAND gate G2 outputs a signal that is formed by delaying only the rise of the Q-output of the flip-flop 303 by the time period T2 set by a timer 306 in order to control the fuel supplying pump 255. The output Q of a flip-flop 307 is set by a first rise of the NAND gate G2, and thereafter maintains its on-state during the engine operation. The output Q drives the air-supplying pump 256. The output of the NAND gate G2 is also input to a trigger generator 308 that allows the spark plugs 97a and 97b to ignite.

Figure 15:
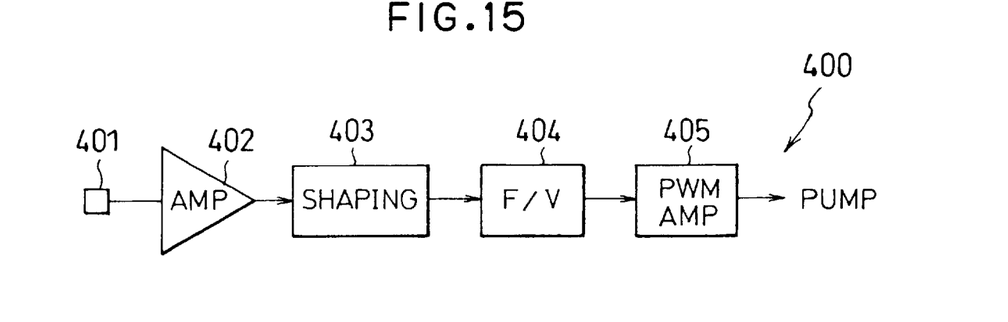
FIG. 15 is a block diagram showing an arrangement of a pump controller in the burning control to the filter.
Figure 16:
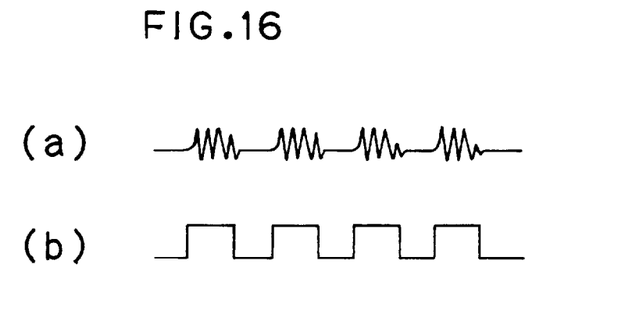
FIG. 16 is a waveform diagram showing an operation of the pump controller.
Figure 17:
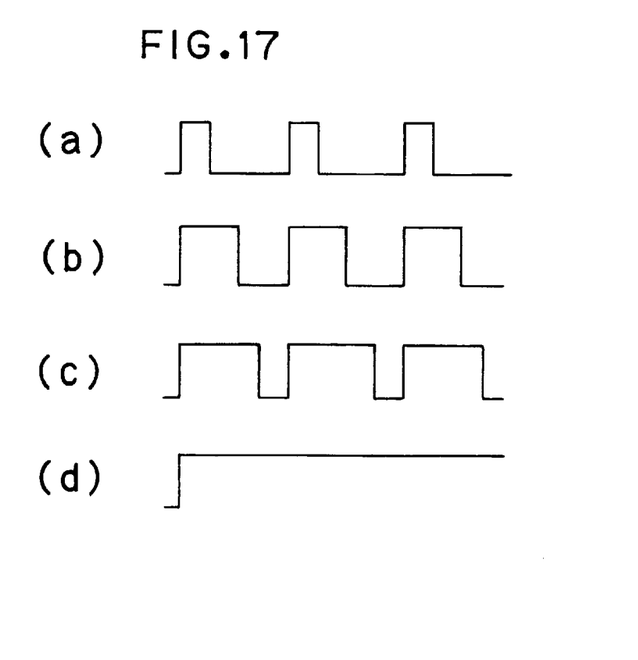
FIG. 17 is a waveform diagram showing an operation of the pump controller.

Supply amounts of the fuel and air are preferably those that correspond to revolutions of the engine 1. For this reason, a pump control circuit 400 is fabricated in the controller 252 as shown in FIG. 15. An output signal detected at a microphone 401, which corresponds to intermittent explosive sounds as shown in FIG. 16(a), is amplified by an amplifier 402. The output signal from the amplifier 402 is shaped by a waveform shaping circuit 403 into a pulse signal as shown in FIG. 16(b). A frequency-voltage converter (F/V converter) 404 converts a frequency of the output pulse from the waveform shaping circuit 403 into a voltage. A PWM amplifier 405 outputs a signal with a pulse width corresponding to the output voltage from the F/V converter 404. Thus, control pulses with different pulse widths in four-stage according to frequencies can be obtained as shown in FIG. 17, for example.

In this exhaust gas-reducing device, the filter 10d can solve the disadvantage of returning the black smoke to the intake portion, which is problematic in the EGR device. As a result, the EGR device 110 can work efficiently and the black smoke can be effectively reduced along with NOx. In addition, arranging the catalyzing device 105 at the rear stage of the filter 10d can further reduce CO, HC and NOx, and this is extremely effective for the exhaust gas control.

As described above, according to the present invention, the filter forms a plurality of paths extending in the direction of the exhaust gas flow. Then, the exhaust gas is introduced into one side and emitted from the other side of the paths. In this process, the fine particles are captured at the walls of the paths. Therefore, the exhaust gas can flow extremely smoother and the exhaust resistance can be suppressed sufficiently lower than the conventional systems that filter the gas with porous materials, thereby preventing the output from lowering. In addition, the ashes, which remains after burning the fine particles captured at the partition walls, are smoothly ejected to the outside of the filter and do not stay over the filter surfaces. Thus, the apparatus can be simplified.

What is claimed is:

1. A fine particle-removing apparatus for removing fine particles contained in an exhaust gas emitted from a combustion engine, said apparatus comprising:

a filter for removing said fine particles contained in said exhaust gas, wherein said filter has a plurality of filter units arranged in a direction of a flow of said exhaust gas, each of said filter units having a plurality of paths and partitions that extend in said direction of said flow of said exhaust gas and are open-ended, said partitions having surfaces, said plurality of paths being defined by said plurality of partitions, and said filter having an exhaust gas intake portion;

a fuel injection nozzle near said filter for injecting a fuel into said exhaust gas intake portion of said filter; and an ignition means near said filter for igniting said fuel injected from said fuel injection nozzle, said filter being heated in a predetermined temperature range, whereby combustion at said surfaces of said partitions is continued, and whereby said fine particles contained in said exhaust gas are burnt to ashes in said filter, said ashes being ejected from said filter in accordance with said exhaust gas.

2. The fine particle-removing apparatus according to claim 1, wherein said partitions are made of a porous solid.

3. The fine particle-removing apparatus according to claim 1, wherein said plurality of partitions are a plurality of porous ceramic plates that are arranged in parallel.

4. The fine particle-removing apparatus according to claim 3, wherein porous ceramic plates in adjacent filter units are arranged to cross with each other at right angle.

5. The fine particle-removing apparatus according to claim 3, wherein porous ceramic plates in adjacent filter units are arranged in parallel to each other.

6. The fine particle-removing apparatus according to claim 1, further comprising a means for introducing a combustion-promoting gas into said exhaust gas intake portion of said filter.

7. The fine particle-removing apparatus according to claim 1, wherein said filter includes a combustion-promoting agent applied on at least parts of the surface of said partitions.

8. The fine particle-removing apparatus according to claim 1, wherein said filter is accommodated in a container, said container including a combustion chamber with said fuel injection nozzle and said ignition means integrally formed therein.

9. The fine particle-removing apparatus according to claim 1, further comprising:

a temperature sensor for detecting a temperature of said filter; and a control means for allowing said fuel injection nozzle to inject said fuel and said ignition means to perform an igniting operation if said temperature sensor detects a temperature lowered down to a first temperature, and halting said fuel injection nozzle to inject said fuel if said temperature sensor detects a temperature elevated up to a second temperature higher than said first temperature.

10. An exhaust gas cleaning apparatus, comprising:

a fine particle-removing device connected to an exhaust path for an exhaust gas emitted form a diesel engine, for removing fine particles contained in said exhaust gas; and an exhaust gas return control device for returning said exhaust gas from said exhaust path of said fine particle-removing device to an intake path of said diesel engine, wherein said fine particle-removing device includes:

a filter for removing said fine particles contained in said exhaust gas, wherein said filter contains a plurality of paths and partitions that extend in a direction of a flow of said exhaust gas and are open-ended, said partitions having surfaces, and said filter having an exhaust gas intake portion;

a fuel injection nozzle near said filter for injecting a fuel into said exhaust gas intake portion of said filter; and an ignition means near said filter for igniting said fuel injected from said fuel injection nozzle, said filter being heated in a predetermined temperature range, whereby combustion at said surfaces of said partitions is continued, and whereby said fine particles contained in said exhaust gas are burnt to ashes in said filter, said ashes being ejected from said filter in accordance with said exhaust gas.

11. The exhaust gas cleaning apparatus according to claim 10, further comprising a catalyzing device for removing harmful gaseous components at said exhaust path of said fine particle-removing device.

* * * * *